United States Patent [19]
Love

[11] 4,297,065
[45] Oct. 27, 1981

[54] SELF-LOADING APPARATUS FOR TRANSPORTING LARGE BALES OF MATERIAL

[76] Inventor: Phillip W. Love, P.O. Box 323, Smithville, Tenn. 37166

[21] Appl. No.: 140,769

[22] Filed: Apr. 16, 1980

[51] Int. Cl.[3] .......................... A01D 90/02; B60P 1/08
[52] U.S. Cl. .................................. 414/24.5; 414/436; 414/739; 414/911
[58] Field of Search ..................... 414/24.5, 24.6, 434, 414/435, 436, 442, 485, 684, 738, 739, 911

[56] References Cited

U.S. PATENT DOCUMENTS

| | | | |
|---|---|---|---|
| 3,877,595 | 4/1975 | Edelman | 414/485 X |
| 4,053,069 | 10/1977 | Love | 414/24.5 |
| 4,062,454 | 12/1977 | Priefert | 414/422 X |
| 4,084,711 | 4/1978 | Armstrong | 414/24.5 |
| 4,089,425 | 5/1978 | Baltz | 414/24.5 |
| 4,103,831 | 8/1978 | Laudemann et al. | 414/911 X |
| 4,113,116 | 9/1978 | Brandt | 414/24.6 |

FOREIGN PATENT DOCUMENTS

| | | | |
|---|---|---|---|
| 380282 | 7/1973 | U.S.S.R. | 414/739 |

*Primary Examiner*—Leslie J. Paperner
*Attorney, Agent, or Firm*—Terry M. Crellin

[57] ABSTRACT

A self-loading apparatus for picking up and moving a large bale of material, such as large, cylindrical shaped bales of hay having diameters up to about 3 or 4 feet and longitudinal lengths up to about 5 or 6 feet. The apparatus includes a main frame member supported on wheels mounted near the end of the main frame. A hitch frame has one end pivotally connected to the front end portion of the main frame, with the other end of the hitch frame adapted for attachment to a tow vehicle. The main frame is adapted to be tilted upwardly about the support wheels when braking means on the wheels are activated and the tow vehicle is backed up. A pair of load engaging and clamping swing arms are pivotally attached to the respective sides of the main frame. Means are provided with the main frame and hitch frame for pivotally moving the swing arms away from each other when the main frame is tilted upwardly and, conversely, for pivotally moving the swing arms toward each other when the main frame is lowered by moving the tow vehicle forward while braking means on the wheels of the main frame is activated.

3 Claims, 8 Drawing Figures

SELF-LOADING APPARATUS FOR TRANSPORTING LARGE BALES OF MATERIAL

BACKGROUND OF THE INVENTION

1. Field:

The invention relates to picking up and transporting large bales of material, such as large, cylindrically shaped bales of hay, and to apparatus for accomplishing same.

2. State of the Art:

Numerous apparatus have been proposed and used for handling large bales of material. Generally, the apparatus is used in combination with fork lift trucks or the like, and have been used mainly in warehouses. Representative devices are shown in U.S. Pat. Nos. 3,334,762; 3,876,093; and 3,929,366.

With the recent development of farm equipment for producing large, cylindrical shaped bales of hay, various apparatus have been designed for transporting and handling the large bales of hay. In an earlier patent issued to me, i.e., U.S. Pat. No. 4,053,069, I disclosed apparatus having a tilt frame and a pair of rearward extending bale clamping members pivotally attached to the tilt frame. Means was provided for swinging the bale clamping means into engagement with the ends of a bale of hay and then tilting the otherwise vertical tilt frame forward so as to lift the bale of hay from the ground. Other devices for handling large bales of hay are disclosed in U.S. Pat. Nos. 3,877,595; 3,944,095; 4,072,241; 4,089,425; 4,113,116; and 4,138,159.

OBJECTIVE

A principal objective of the present invention is to provide improved apparatus of the type used in picking up and moving a large bale of material, such as a large bale of hay.

SUMMARY OF THE INVENTION

The present invention provides improved apparatus for picking up and moving a large bale of material, such as big bales of hay having dimensions of up to about 4 or 5 feet by 5 or 6 feet. The bales can be picked up and moved without requiring the operator of the tow vehicle to get out of or leave the towing vehicle during the entire operation. The bale of material is picked up using traction from the towing vehicle with no auxiliary power means such as winches and hydraulic equipment used on much of the apparatus of the prior art.

The apparatus of the present invention comprises a main frame member supported on wheels mounted at the rear end portion thereof. The wheels support the main frame through a pivot axis transverse to the main frame near or at the rear end of the main frame. Braking means are provided whereby the wheels on which the main frame is supported can be braked from the towing vehicle. Preferably, the wheels are provided with electrically activated brakes which can be operated from the cab of the towing vehicle.

A hitch frame has one end pivotally connected to the front end portion of the main frame, with the other end of the hitch frame being adapted to be connected to a tow vehicle. When the braking means are activated and the tow vehicle is backed up, the front portion of the main frame swings upwardly, and when the braking means are activated and the tow vehicle moves forward, the front end portion of the main frame swings back downwardly.

A pair of load engaging and clamping swing arm members are pivotally attached to the respective sides of the main frame so that the swing arm members extend generally backwardly from the main frame when the main frame is swung into its upwardly standing position. Each swing arm member is adapted to pivot about an axis substantially parallel to the mutually corresponding side of the main frame to which it is attached, so that the outward ends of the swing arms can rotate towards and away from each other.

Means are provided in association with the main frame and hitch frame for pivotally moving the outward ends of the swing arms away from each other and slightly outwardly from the respective sides of the main frame when the forward end of the main frame is swung upwardly and, conversely, for pivotally moving the outward ends of the swing arms towards each other when the forward end of the main frame moves back downwardly.

In picking up and transporting a bale of material, the apparatus is moved so that the bale of material is positioned to the back of the apparatus, with the longitudinal axis of the bale of material being substantially parallel to the back end of the apparatus. The brakes on the wheels of the main frame are activated and the towing vehicle is backed up towards the bale of material, whereby the main frame moves into its upward position with the swing arms extending outwardly from the sides of the main frame. The brakes on the wheels of the main frame are then released and the apparatus is moved backwardly so that the swing arms cradle the opposite ends of the bale of material. The wheels on the main frame are then again braked and the tow vehicle moves forwardly. The swing arms pivot towards each other and into engagement with the opposite ends of the bale of material. Further, as the forward end of the main frame moves downwardly, the swing arms pivot up away from the ground thus picking the bale of material up and off the ground. The bale of material can now be transported as desired.

Additional features and objectives of the present invention will become more apparent from the following detailed description taken together with the accompanying drawings.

THE DRAWINGS

An embodiment representing the best mode presently contemplated of carrying out the invention is illustrated in the accompanying drawings in which.

DETAILED DESCRIPTION OF THE ILLUSTRATED EMBODIMENT

Figure 7:
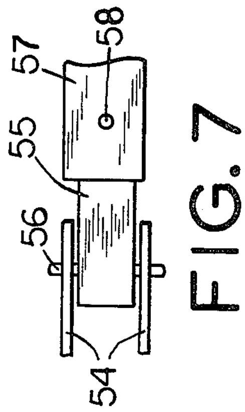
FIG. 7 is a fragmentary section taken on line 7—7 of FIG. 6.

Referring to the drawings, the apparatus of the invention is shown as an agricultural vehicle for carrying and transporting large bales of hay. The vehicle comprises a main frame formed by parallel side members 20, a rear end member 21, and a cross member 22 extending between the side members 20, with the cross member 22 being positioned intermediate the forward ends of side members 20 and the rear end member 21 which is attached at the trailing ends of the side members 20, respectively. As illustrated, the cross member 22 is preferably located somewhat closer to the rear end member 21 than the front of the main frame or forward ends of the side members 20. The main frame is supported on a pair of wheels 23 mounted on an axle 24 which is parallel to and positioned adjacent to the rear end member 21. The axle 24 forms a pivot axis transverse to the main frame and about which the main frame can rotate as will be described hereinafter.

Braking means are provided for braking the wheels 23 relative to the main frame. As illustrated, the braking means comprise conventional electric brakes housed within the wheels 23, with the electric brakes having electrical wires 25 (FIG. 2) extending from the wheels 23 to a connection on the towing vehicle 26, so that the brakes can be operated from the towing vehicle 26.

A hitch frame has one end thereof pivotally connected to the front end portion of the main frame. As illustrated, the hitch frame comprises an elongate tongue member 27 having one end adapted for attachment to the towing vehicle 26. A transverse beam 28 is attached to the rear end of the tongue member 27 and forms the trailing end of the hitch frame. A pair of strut members 29 are attached from the ends of the beam 28 to the tongue member 27 intermediate its ends. The ends of the beam 28 are also attached to plate members 30 which are in turn pivotally connected to the mutually respective front ends of the side members 20 of the main frame.

Figure 1:
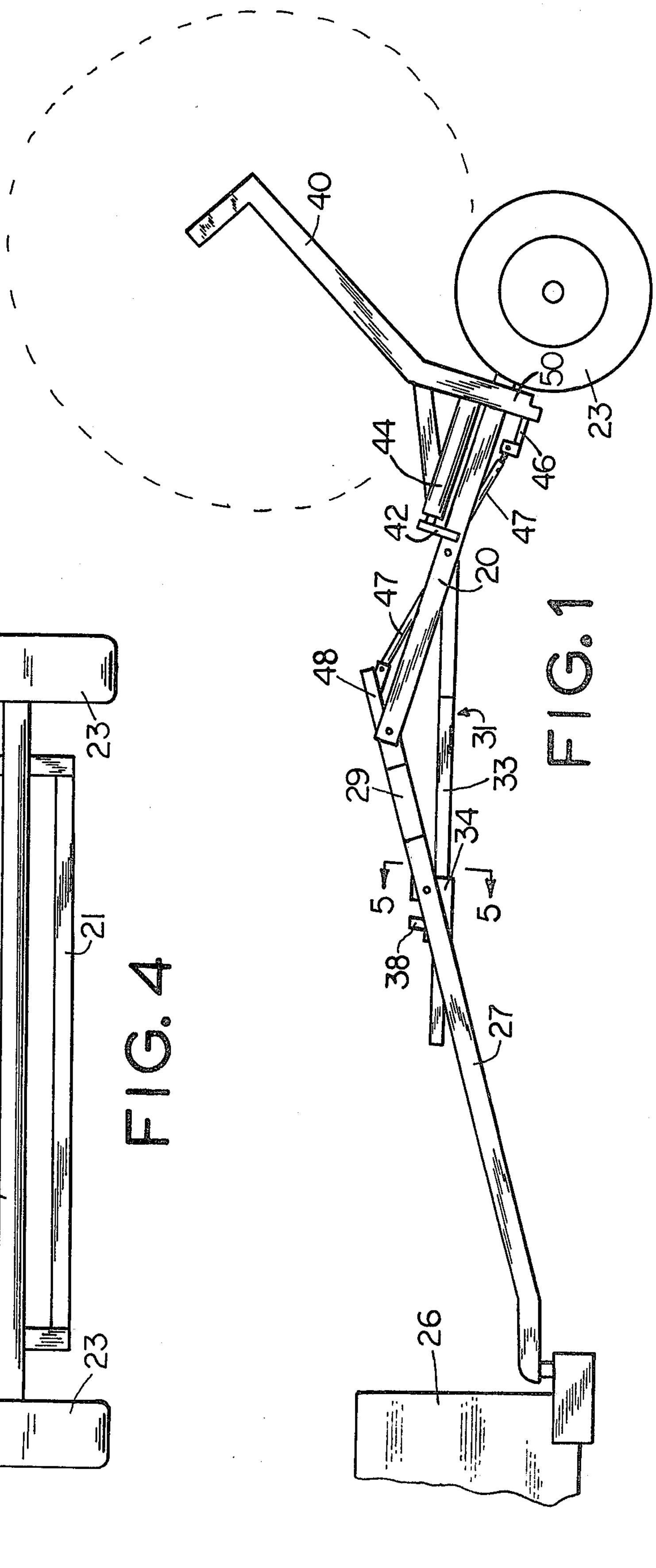
FIG. 1 is a side elevational view of the apparatus, with the main frame of the apparatus in its lowered position and showing a bale of material in phantom as it would be carried by the apparatus.
Figure 5:
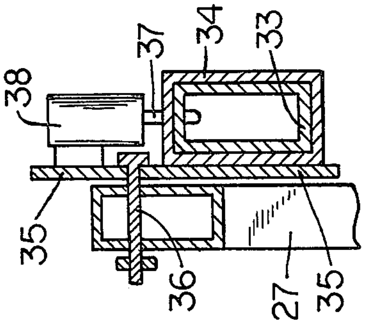
FIG. 5 is a transverse sectional view taken on line 5—5 of FIG. 1.

The main frame and hitch frame are adapted to lie in a somewhat horizontal position when the apparatus is supporting and transporting a bale of hay. Such a position is shown in FIG. 1. In the support and transport position, the main frame and hitch frame are held securely in position with respect to each other by a support and guide member shown generally by the numeral 31. As shown in FIG. 1, the ends of the main frame and the hitch frame which are pivotally attached together are somewhat elevated with respect to the other ends thereof. The support and guide member 31 comprises a cross member 32 pivotally attached at its opposite ends to the respective side members 20 of the main frame. The member 31 is spaced between the end of the main frame which is connected to the hitch frame and the cross member 22 of the main frame. An elongate slide member 33 is mounted at its one end to the cross member 32 somewhere intermediate the ends of the cross member 32. The slide member 33 extends forwardly in proximity to the tongue member 27 of the hitch frame. The slide member 33 is adapted to slide longitudinally through a sleeve member 34 which is in turn pivotally attached to the tongue member 27. As best shown in FIG. 5, the sleeve member 34 is attached to a side plate 35 and the side plate 35 is pivotally mounted to tongue member 27 by a pivot bolt 36. The slide member 33 slides coaxially within the sleeve member 34. A solenoid activated pin 37 is mounted to the side plate 35 and is adapted to extend through aligned openings in the slide member 33 and sleeve 34 when the apparatus is in its support and transport position as shown in FIG. 1. The pin 37 locks the sleeve 34 and slide member 33 together and this in turn locks the main frame and hitch frame together as a unit.

Figure 3:
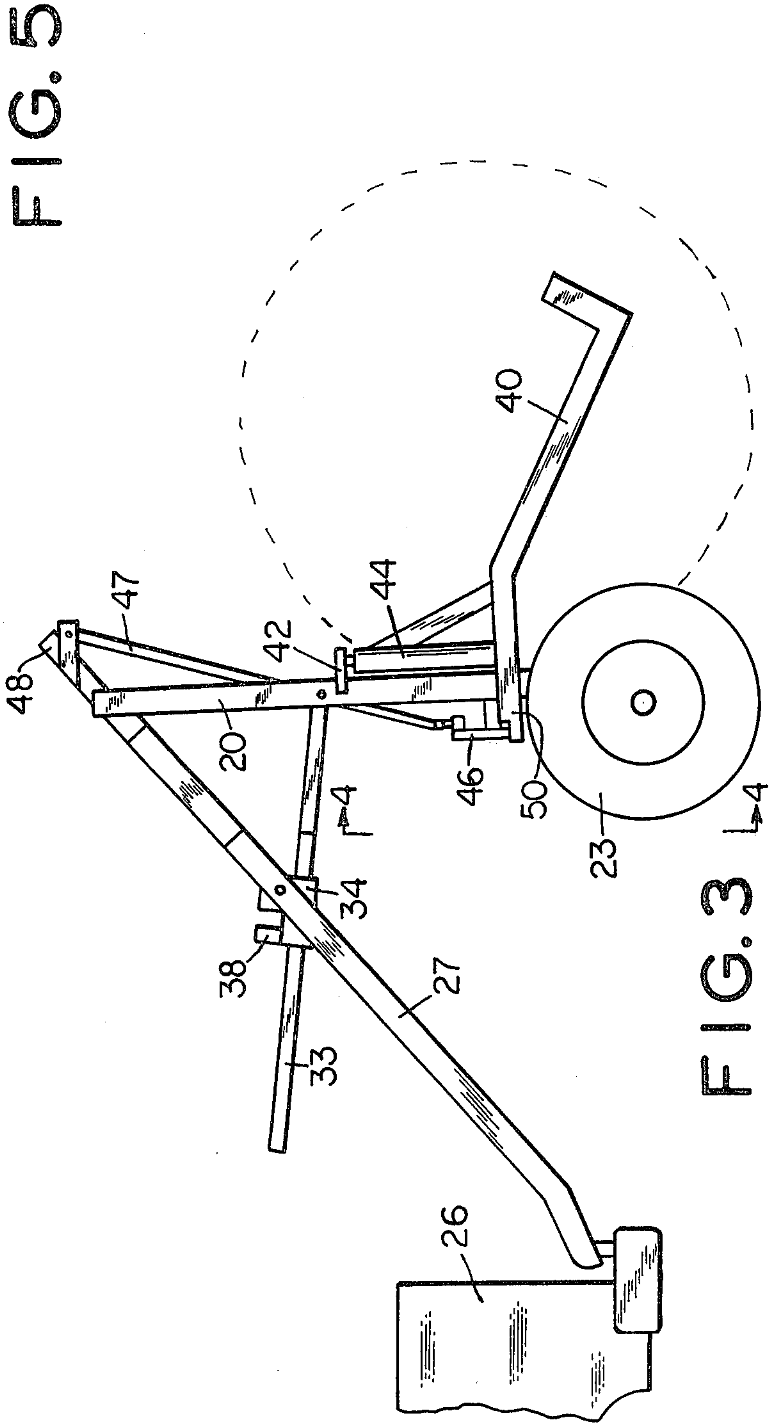
FIG. 3 is a side elevational view of the apparatus, with the main frame of the apparatus in its upwardly extending position and showing a bale of material in phantom ready to be picked up by the apparatus.

The main frame is adapted to be moved to a substantially vertical position as shown in FIG. 3. In moving the main frame to its vertical position from its transport position shown in FIG. 1, the solenoid 38 is activated through electrical wires 39 from the towing vehicle 26, and the pin 37 is withdrawn from the openings in the sleeve member 34 and slide member 33. The electric brakes on the wheels 23 are activated from the towing vehicle 26 via the control wires 25, and the towing vehicle is backed up. The main frame then rotates about the pivot axis through axle 24 to its upright position as shown in FIG. 3. With the wheels braked, the main frame can be again lowered to its down position by moving the towing vehicle 26 ahead. As the main frame is rotated upwardly, the slide member 33 slides forwardly through the sleeve member 34 to a position shown in FIG. 3. Another opening can be provided on the slide member 33 for receiving the pin 37 when the main frame is in the upright position. This would lock the main frame in the upright position. With main frame locked in its upright position, the brakes on the wheels 23 can be released and the apparatus can be moved into desired location with the main frame in its vertical position. Then in lowering the main frame, the solenoid 38 would be activated to withdraw the pin from the opening in the slide member 33.

The upward and downward movement of the main frame is used in loading a bale of material as will now be explained. A pair of bale or load engaging and clamping swing arms 40 are pivotally attached to the parallel side members 20, respectively. The swing arms 40 are adapted to pivot about an axis substantially parallel to the corresponding side members 20. The swing arms are mounted so as to extend rearwardly from the main frame member when the main frame member is in its vertical position. Means are provided for moving the free ends of the swing arms 40 away from each other when the main frame is rotated to its upwardly standing, vertical position and, conversely, for moving the free ends of the swing arms 40 towards each other as the main frame back downwardly. A plurality of spikes 41 are attached to the free ends of the swing arms 40. The spikes 41 are directed inwardly towards each other and adapated to stick into a bale material which is to be loaded and transported. In operation, the main frame is moved into its upright vertical position, and the apparatus is positioned with the bale of material shown by dashed lines in FIG. 3 between the swing arms 40. The main frame is then lowered and the swing arms simultaneously move inwardly towards each other to engage the bale of material. As the main frame continues to move downwardly the ends of the swing arms 40 which have engaged the bale of material pivot upwardly to pick the bale of material up. As the main frame moves to its lowered position, the bale of material is supported as shown by dashed lines in FIG. 1.

Figures 2, 8:
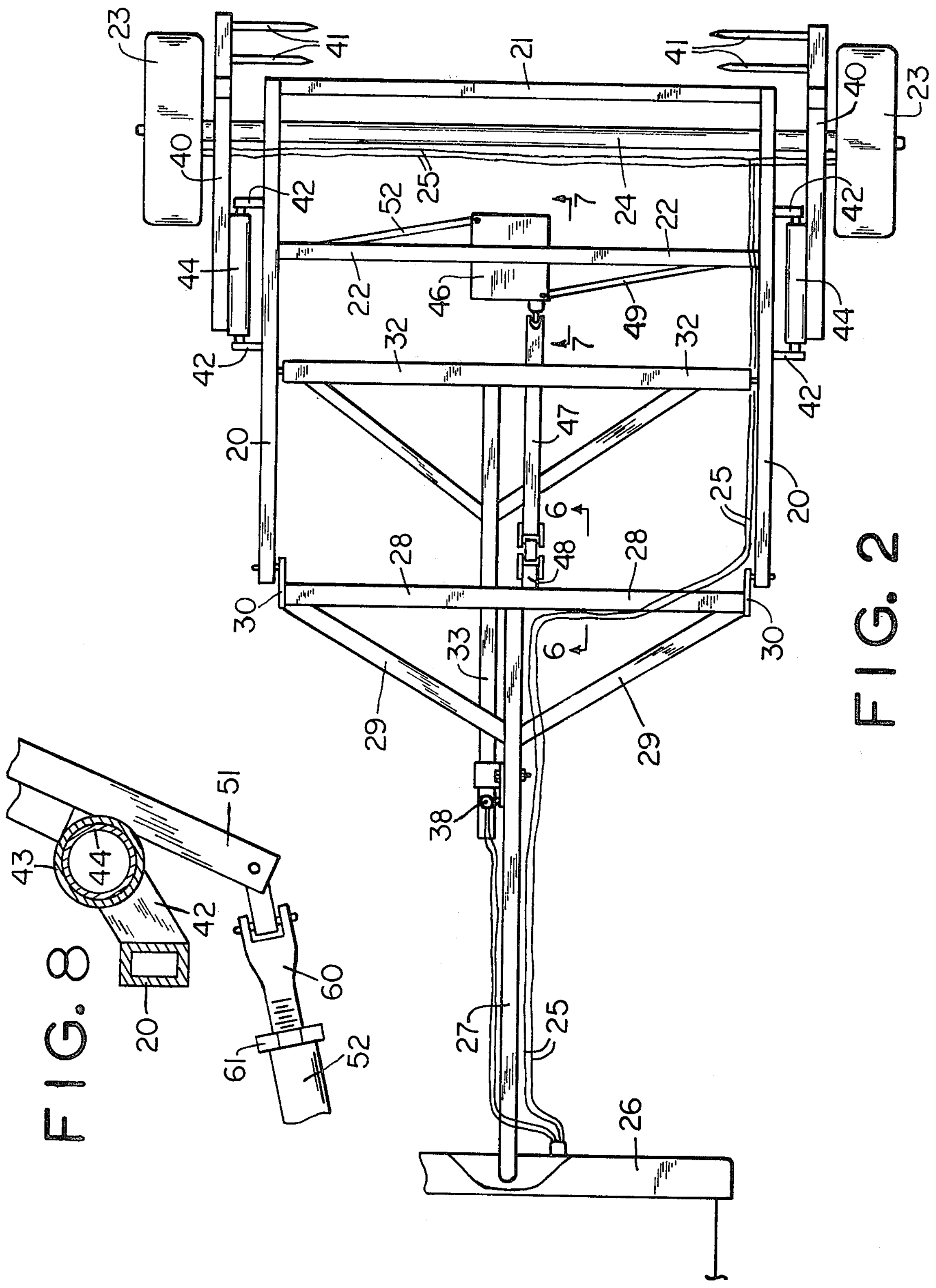
FIG. 2 is a top plan view of the apparatus of FIG. 1.
FIG. 8 is a fragmentary horizontal section taken on line 8—8 of FIG. 4.

As illustrated, the swing arms 40 are pivotally attached to the side members 20 by a coaxial conduit system. An inner conduit 44 shown in FIG. 8 is attached by brackets 42 at its opposite ends, with the brackets 42 extending from the side members 20 as shown in FIGS. 1-4. An outer conduit 43 is positioned coaxially about the inner conduit 44. The outer 43 conduit is adapted to rotate about the inner conduit 44. Mutually respective ends of the swing arms 40 are attached to the lower ends of the outer conduits 43, with braces 45 attached between the upper ends of the outer conduits and the respective swing arms 40.

The means for pivotally moving the swing arms 40 comprises a pivot block 46 attached to the mid-section of the cross member 22 of the main frame. The pivot block 46 is adapted for pivotal movement about an axis through its central portion and normal to the plane of the main frame. One corner of the pivot block 46 is attached to one end of an elongate push-pull member 47. The other end of the push-pull member 47 is attached to an extension 48 extending slightly from the transverse beam 28 of the hitch frame. The extension 48 extends from the transverse beam 28 in a direction opposite to the tongue member 27.

A second elongate push-pull member 49 is pivotally connected at one end thereof to the same corner of the pivot block 46 as the one end of the first push-pull member 47. The other end of the second push-pull member 49 is pivotally attached to a short extension 50 of one of the swing arms 40. The short extension 50 extends from the outer conduit 43 directly opposite from the respective swing arm 40 so that when the end of the extension 50 is pushed outwardly from the central portion of the main frame, the spiked end of the swing arm 40 swings inwardly toward the central longitudinal axis of the main frame. A third elongate push-pull member 52 is pivotally connected at one end thereof to the corner of the pivot block 46 which is on the diagonal through the pivot block 46 from the corner to which the first and second push-pull member 47 and 49 are attached. The other end of the third push-pull member 52 is pivotally attached to a short extension 51 of one of the swing arms 40. The short extension 51 is similar to its counterpart member 49 explained above.

Figure 4:
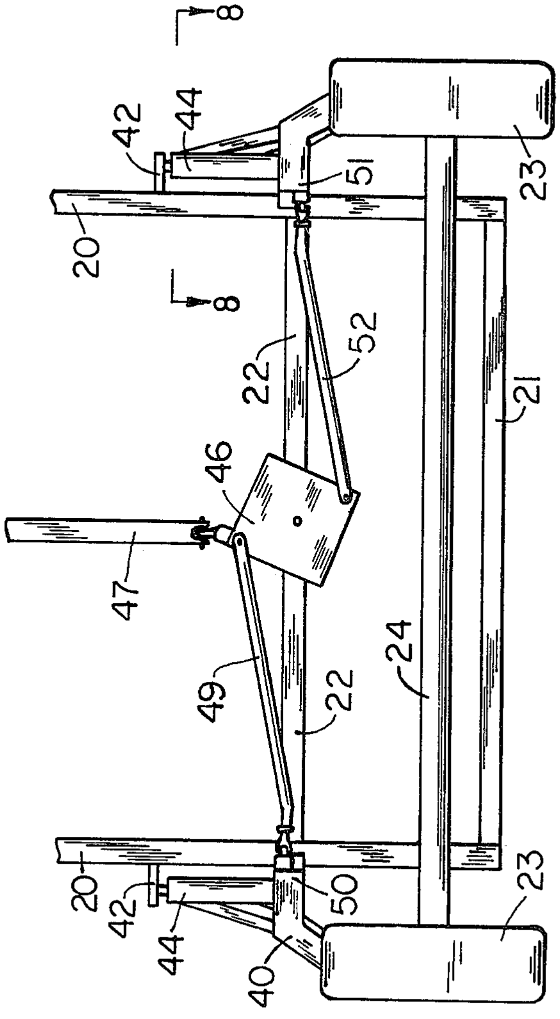
FIG. 4 is a partial end elevational view taken on line 4—4 of FIG. 3.

When the main frame is in its lowered position as shown in FIGS. 1 and 2, the first push-pull member 47 pushes in a direction toward the back of the main frame and causes the pivot block 46 to rotate on its axis so that the second and third push-pull members 49 and 52 push outwardly from the main frame, thus causing the spiked ends of the swing arms 40 to move inwardly in their bale engagement positions. When the main frame is pivoted upwardly to its upstanding position as shown in FIGS. 3 and 4, the first push-pull member 47 is pulled upwardly away from the pivot block 46 and causes the pivot block to rotate about ¼ turn on its axis so that the second and third push-pull members 49 and 52 pull inwardly thus causing the spiked ends of the swing arms 40 to move outwardly to release a bale or to be positioned about a bale for subsequently picking the bale up.

The pivot block 46 and push-pull members 47, 49, and 52 are particularly advantageous means for pivotally moving the swing arms 40. When the device has been positioned with the main frame in its upward position and the swing arms about the opposite ends of the bale of material to be picked up, the wheels 23 are braked and the towing vehicle 26 moves forward to start the main frame in its pivotal downward movement. During the initial downward movement, the rotation of the pivot block 46 pushes the push-pull members 49 and 52 outwardly at a more rapid pace than during the latter portion of the downward movement of the main frame. Thus, the spiked ends of the swing arms rapidly come into contact with and engage the opposite ends of the bale of material during the initial portion of the downward movement of the main frame. As the main frame then further moves downwardly, the swing arms move upwardly as well as inwardly to pick the bale of material up into a position shown by the dashed lines in FIG. 1.

Other means could be substituted for the pivot block 46. For example, a sleeve could be positioned about the first push-pull member 47 intermediate its ends so that the member 47 could slide back and forth within the sleeve. The push-pull members 49 and 52 would have mutually corresponding ends pivotally attached to the end of the push-pull member 47. Such a means for pivotally moving the swing arms would, however, produce a uniform steady rate movement of the swing arms as the main frame pivots from its upstanding position to its lowered position. As mentioned above, it is advantageous to have the swing arms 40 pivot inwardly more rapidly during the initial downward movement of the main frame so as to quickly engage the bale of material which is to be picked up.

Figure 6:
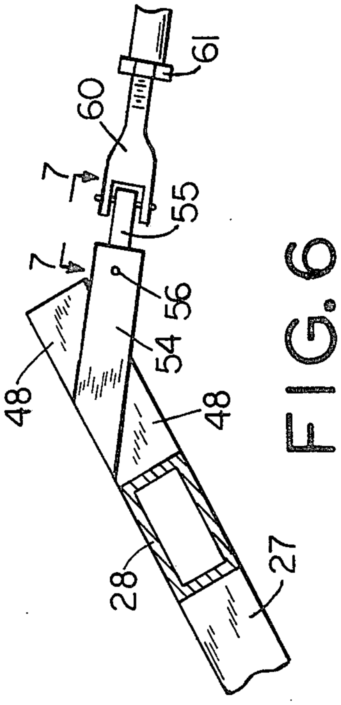
FIG. 6 is a fragmentary vertical section taken on line 6—6 of FIG. 2.

The push-pull member 47 is pivotally attached at its opposite ends to the pivot block 46 and the extension 48 by a double pivotal connection such as the universal joint or connection used in the drive shafts of automobiles or the connecting means shown in FIGS. 6 and 7. The pivotal connecting means of FIGS. 6 and 7 comprises a pair of spaced plates 54 which are attached to and extend from the extension member 48. A short block 55 is positioned between the plates 54 and pivotally attached to a pivot pin 56 extending from one plate 54 to the other. The end of the push-pull member 47 has brackets 57 extending therefrom which are positioned around the other end of the block 55. A pivot pin 58 extends through the block 55 from one bracket 57 to the other, with the pivot pin 58 being in a perpendicular plane to the plane of pin 56. The other end of the push-pull member is attached to the pivot block in a similar manner, and the push-pull members 49 and 52 are attached to the pivot block 46 and respective extensions of the swing arms 40 using the same type double pivoting connections.

In the preferred embodiment, means are provided for adjusting the lengths of the push-pull members 47, 49, and 52. As illustrated in FIGS. 6 and 8, one or both of the ends of the push-pull members can comprise a threaded end piece 60 which is threaded into internal threads in the end of the push-pull members. A lock nut 61 is provided for securing the end piece 60 in fixed position. Adjustment is made by loosening the lock nut 61 and then either threading the end piece 60 into the push-pull members or unthreading the end piece 60. When the correct adjustment is achieved, the lock nut 61 is again tightened against the end of the push-pull members to prevent unwanted threading or unthreading of the end member 60.

The tongue member 27 is advantageously attached to the towing vehicle 26 by a conventional ball hitch, which allows the tongue member to pivot upwardly from the ball member as shown in FIG. 3 when the main frame is moved into its upstanding position.

It is to be understood that various modifications can be made to the embodiment of the apparatus shown in the drawings without departing from the novel features of the invention as particularly pointed out in the claims which follow.

I claim:

1. Apparatus for picking up and transporting a large bale of material, such as a bale of hay, comprising:

a main frame;

wheel means supporting the main frame through a first pivot axis transverse to the main frame at the rear end portion of the main frame;

braking means for braking the wheels relative to the main frame;

a hitch frame having one end pivotally connected to the front end portion of the main frame, with the other end of the hitch frame adapted to be connected to a tow vehicle, so that when the braking means are activated and the tow vehicle is backed up, the front end portion of the main frame swings upwardly, and when the braking means are activated and the tow vehicle moves forward, the front end portion of the main frame swings back downwardly;

a pair of load engaging and clamping swing arm members pivotally attached to the respective sides of the main frame, each swing arm member being adapted to pivot about an axis substantially parallel to the corresponding side of said main frame to which it is attached; and means associated with the main frame and hitch frame for pivotally moving the outward ends of the swing arms away from each other when the forward end of the main frame is swung upwardly and, conversely for pivotally moving the outward ends of the swing arms toward each other when the forward end of the main frame moves back downwardly, whereby a bale of material is picked up for transportation by raising the front end portion of the main frame member and positioning the apparatus adjacent to the bale so that the swing arms extend outwardly adjacent opposite ends of the bale of material, applying the braking means, and moving towing vehicle forward to simultaneously lower the front end portion of the main frame and pivotally move the swing arms into engagement with the ends of the bale of material, whereupon the bale is engaged, lifted up, and supported by the swing arms.

2. Apparatus in accordance with claim 1, wherein the means associated with the main frame and hitch frame for pivotally moving the swing arms comprises:

a pivot block mounted on the main frame for pivotal movement about an axis perpendicular to the plane of the main frame;

an elongate push-pull member having one end pivotally attached to the perimeter of the pivot block and the other end thereof pivotally attached to the hitch frame so that when the main frame is moved into its upstanding position, the push-pull member pulls on the pivot block thereby rotating the pivot block and when the main frame is moved back to its lowered position, the push-pull member pushes on the pivot block thereby rotating the pivot block in the opposite direction; a second push-pull member having one end pivotally attached to the pivot block near the attachment of the first push-pull member thereto, the other end of said second push-pull member being pivotally attached to one of the swing arms; a third push-pull member having one end pivotally connected to the pivot block diametrically from the attachment of said first and second push-pull members, the other end of said third push-pull member being pivotally attached to the other swing arm, whereby when the pivot block is rotated when the main frame is moved into its pustanding position, the second and third push-pull members push the swing arms so that the outward ends thereof move away from each other, and conversely when the main frame is moved downwardly, the second and third push-pull members pull the swing arms so that the outward ends thereof move away from each other.

3. Apparatus in accordance with claim 2, wherein means are provided for adjusting the length of the push-pull members.

* * * * *